US008176456B2

(12) United States Patent
Wang et al.

(10) Patent No.: US 8,176,456 B2
(45) Date of Patent: May 8, 2012

(54) METHOD AND APPARATUS FOR COMPUTING DUMMY FEATURE DENSITY FOR CHEMICAL-MECHANICAL POLISHING

(75) Inventors: Xin Wang, Pasadena, CA (US); Charles C. Chiang, San Jose, CA (US); Jamil Kawa, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 605 days.

(21) Appl. No.: 12/343,958

(22) Filed: Dec. 24, 2008

(65) Prior Publication Data

US 2009/0106725 A1    Apr. 23, 2009

Related U.S. Application Data

(62) Division of application No. 10/997,396, filed on Nov. 24, 2004, now Pat. No. 7,594,213.

(60) Provisional application No. 60/524,786, filed on Nov. 24, 2003.

(51) Int. Cl.
*G06F 17/50*    (2006.01)
(52) U.S. Cl. .......................... 716/119; 716/54; 716/118
(58) Field of Classification Search .................... 716/51, 716/54, 118, 119, 122
See application file for complete search history.

(56) References Cited

U.S. PATENT DOCUMENTS 6,883,153 B2 *   4/2005   Jiang et al. .................. 716/108

OTHER PUBLICATIONS

Tian, Ruiqi et al., "Model-Based Dummy Feature Placement for Oxide Chemical-Mechanical Polishing Manufacturability", pp. 902-910, IEEE Transactions on Computer-Aided Design of Integrated Circuits and Systems, vol. 20, No. 7, Jul. 2001.
Chen, Yu et al., "Practical Iterated Fill Synthesis for CMP Uniformity", UCLA Computer Science Department.
Chen, Yu et al., "Monte-Carlo Algorithms for Layout Density Control", UCLA Department of Computer Sciences.

* cited by examiner

*Primary Examiner* — Vuthe Siek
(74) *Attorney, Agent, or Firm* — Park, Vaughan, Fleming & Dowler LLP; Laxman Sahasrabuddhe

(57) ABSTRACT

One embodiment of the present invention provides a system that computes dummy feature density for a CMP (Chemical-Mechanical Polishing) process. Note that the dummy feature density is used to add dummy features to a layout to reduce the post-CMP topography variation. During operation, the system discretizes a layout of an integrated circuit into a plurality of panels. Next, the system computes a feature density and a slack density for the plurality of panels. The system then computes a dummy feature density for the plurality of panels by, iteratively, (a) calculating an effective feature density for the plurality of panels using the feature density and a function that models the CMP process, (b) calculating a filling amount for a set of panels in the plurality of panels using a target feature density, the effective feature density, and the slack density, and (c) updating the feature density, the slack density, and the dummy feature density for the set of panels using the filling amount. In one embodiment of the present invention, the iterative process is guided by a variance-minimizing heuristic to efficiently select the set of panels and assign/remove dummy density to the set of panels to decrease the effective feature density variation.

15 Claims, 8 Drawing Sheets

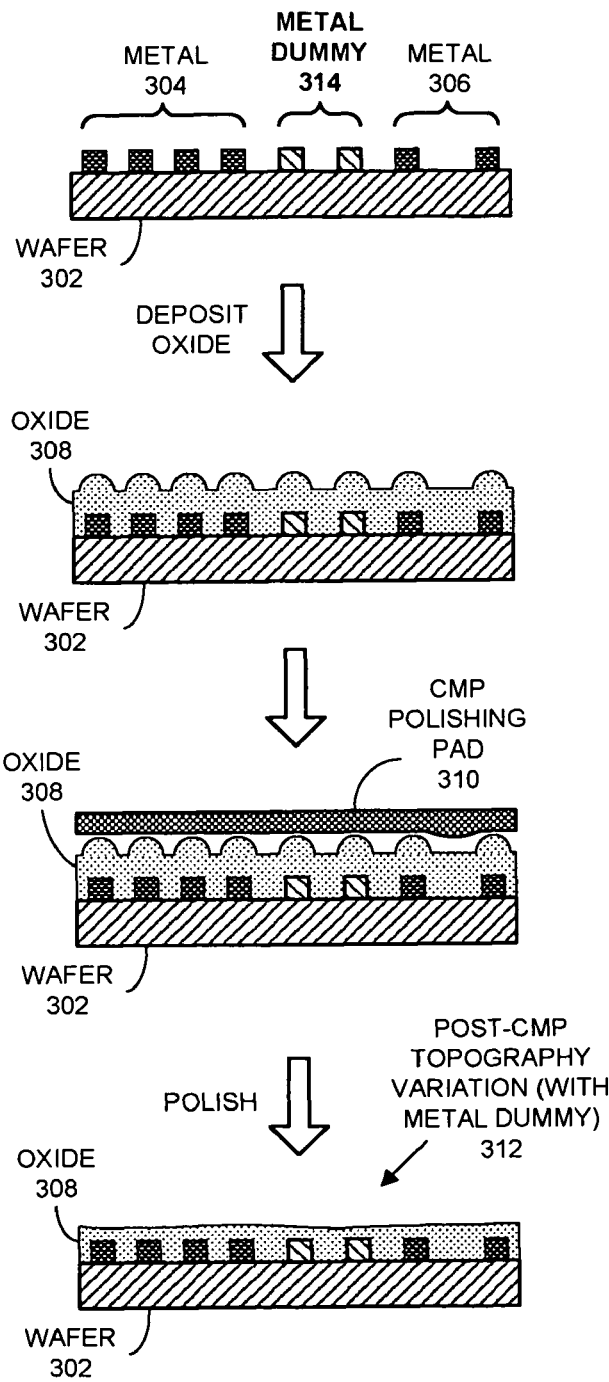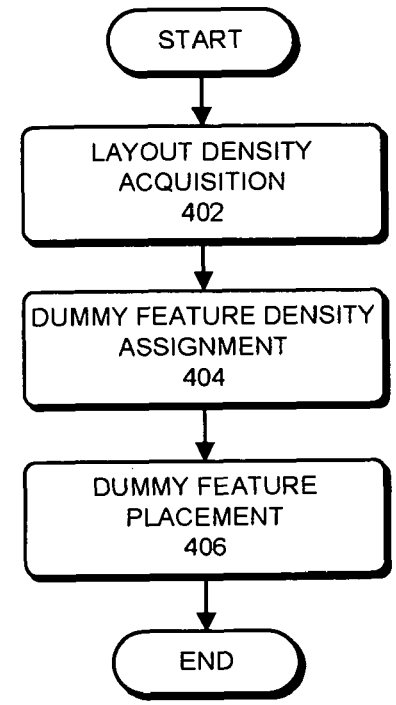
FIG. 3
FIG. 4

METHOD AND APPARATUS FOR COMPUTING DUMMY FEATURE DENSITY FOR CHEMICAL-MECHANICAL POLISHING

RELATED APPLICATION

This application is a divisional application of application Ser. No. 10/997,396, entitled "METHOD AND APPARATUS FOR COMPUTING DUMMY FEATURE DENSITY FOR CHEMICAL MECHANICAL POLISHING," by inventors Xin Wang, Charles C. Chiang, and Jamil Kawa, filed on 24 Nov. 2004, which claims the benefit of provisional Application No. 60/524,786, entitled "Min-variance iterative method for fast smart dummy feature density assignment in chemical-mechanical polishing," by inventors Xin Wang, Charles Chiang, and Jamil Kawa, filed on 24 Nov. 2003.

BACKGROUND

1. Field of the Invention

This invention relates to the process of fabricating semiconductor chips. More specifically, the invention relates to a method and apparatus for computing dummy feature density for performing dummy filling that improves the quality of a Chemical-Mechanical Polishing (CMP) process.

2. Related Art

The miniaturization of integrated circuits has been a key driving force behind technological innovations. Miniaturization of transistors and interconnects has occurred because of the rapid advances in various fabrication technologies, such as "Chemical Mechanical Polishing" (CMP). CMP is used to reduce topography variation of a wafer, and today, it has become a critical process in the semiconductor fabrication flow. CMP polishes a wafer surface to create a flat (planarized) surface. Specifically, CMP combines the chemical removal effect of an acidic or basic fluid solution with the "mechanical" effect provided by polishing with an abrasive material.

Today, CMP is used extensively in the semiconductor fabrication flow. Although CMP makes the wafer surfaces smoother, it does not completely eliminate topography variations. If these post-CMP topography variations are too large, they can cause serious problems during subsequent fabrication steps. For example, these variations can cause defocusing during photolithography, which can result in low fabrication yields and large performance variations.

Moreover, integrated circuits usually contain multiple metal interconnect layers. Hence, the post-CMP topography variations can accumulate over several layers and exacerbate these problems. Furthermore, since miniaturization is expected to continue at a rapid pace (as predicted by Moore's Law), reducing post-CMP topography variation is expected to become even more crucial in the future. Hence, it is critically important to reduce post-CMP topography variation.

Recent studies have shown that post-CMP topography variation depends strongly on feature density. Specifically, it has been shown that the post-CMP topography variation can be reduced by decreasing the non-uniformity of feature density. For example, during the aluminum interconnect fabrication process, the aluminum metal layer is first deposited on the wafer and patterned. Next, an oxide layer that serves as the inter-level dielectric is deposited. Since the underlying metal layer topography is usually not smooth after being patterned, the oxide layer topography is also not smooth. Hence, an oxide CMP process is applied to smooth the wafer surface topography so that fabrication processes that require a flat wafer surface can be performed. The oxide feature density non-uniformity affects the CMP process quality. It is a major cause of the post-CMP oxide topography variation.

Non-uniformity of the oxide feature density can be decreased by adding dummy metal features to low metal density regions of a metal layer. For example, some foundries use simple rule-base techniques to fill dummy features in low density regions to reduce post-CMP topography variation. Adding dummy features also helps to improve the quality of other CMP processes, such as, copper CMP and STI CMP.

Unfortunately, these simple rule-based techniques have many shortcomings because they do not accurately model the complex CMP process. In particular, these techniques can sometimes be ineffective because they add dummy features at suboptimal locations. Moreover, these techniques can be inefficient because they add more dummy features than necessary.

Smart dummy filling techniques, on the other hand, use more accurate CMP models to determine the amount and location of dummy features.

Smart dummy filling techniques based on LP (Linear Programming) can produce optimal results in the case of oxide CMP. But, these techniques can be extremely time-consuming. The computational cost of LP-based methods can become prohibitively high for large layouts with multiple layers. Consequently, LP-based methods are not practical for many real-life dummy-filling scenarios.

On the other hand, greedy heuristics and Monte Carlo methods are computationally efficient, but generate sub-optimal dummy-fillings. Unfortunately, due to the continuing miniaturization of feature sizes, sub-optimal dummy-fillings are not sufficient to significantly improve yields and reduce performance variations.

Hence, what is needed is an efficient method for computing substantially-optimal dummy feature density for a CMP process to reduce the post-CMP topography variation.

SUMMARY

One embodiment of the present invention provides a system that computes dummy feature density for a CMP (Chemical-Mechanical Polishing) process. Note that the dummy feature density is used to add dummy features to a layout to reduce the post-CMP topography variation. During operation, the system discretizes a layout of an integrated circuit into a plurality of panels. Next, the system computes a feature density and a slack density for the plurality of panels. Note that the feature density for a panel specifies the density of existing features in the panel and the slack density for the panel specifies the maximum density of dummy features that can be added to the panel. Furthermore, note that the feature density and the slack density are computed for each panel. The system then computes a dummy feature density for the plurality of panels by, iteratively, (a) calculating an effective feature density for the plurality of panels using the feature density and a function that models the CMP process, (b) calculating a filling amount for a set of panels in the plurality of panels using a target feature density, the effective feature density, and the slack density, and (c) updating the feature density, the slack density, and the dummy feature density for the set of panels using the filling amount. In one embodiment of the present invention, the iterative process is guided by a variance-minimizing heuristic to efficiently select the set of panels and assign/remove dummy density to/from the set of panels to decrease the effective feature density variation. Note that, in general, decreasing the effective feature density variation decreases the post-CMP topography variation. Furthermore, the convergence rate of the dummy feature density computation is increased significantly because, in each iteration, the method updates the dummy feature density for the set of panels, instead of updating the dummy feature density for only a single panel. Typically, in the first several iterations, the set of panels includes almost all of the panels in the plurality of panels. In later iterations, the number of panels in the set of panels usually decreases.

In a variation on this embodiment, the function that models the CMP process is a 2-D filter function.

In a variation on this embodiment, the panel size is less than $\frac{1}{10}$ of the characteristic length of the 2-D filter function.

In a variation on this embodiment, the system efficiently selects panels and computes the dummy feature density by adjusting the characteristic length of the 2-D filter function.

In a variation on this embodiment, the system calculates the filling amount $\Delta(i, j)$ for the set of panels in the plurality of panels by selecting the set of panels using a variance-minimizing heuristic.

In a variation on this embodiment, the system calculates the filling amount by computing the target effective feature density using the effective feature density.

In a variation on this embodiment, the system calculates the effective feature density by normalizing the function that models the CMP process so that a perfectly smooth feature density results in a perfectly smooth effective feature density that is equal to the feature density.

One embodiment of the present invention provides a system that computes dummy feature density for a CMP (Chemical-Mechanical Polishing) process. Note that the dummy feature density is used to add dummy features to a layout to reduce the post-CMP topography variation. During operation, the system discretizes a layout of an integrated circuit into a plurality of panels. Next, the system computes a feature density and a slack density for the plurality of panels. Note that the feature density for a panel specifies the density of existing features in the panel and the slack density for the panel specifies the maximum density of dummy features that can be added to the panel. Furthermore, in one embodiment of the present invention, the feature density and the slack density are computed for each panel. The system then computes the dummy feature density for the plurality of panels by, iteratively, (a) adjusting the characteristic length of a filter function to obtain an adjusted filter function, and (b) updating the dummy feature density for the plurality of panels using the feature density, slack density, and the adjusted filter function. Note that the filter function models the CMP process. Furthermore, the computed dummy feature density is used to add dummy features to the layout, thereby reducing the post-CMP topography variation. Additionally, adjusting the characteristic length of the filter function improves the effectiveness of the dummy feature density computation in reducing the post-CMP topography variation.

In a variation on this embodiment, the system updates the dummy feature density by (a) calculating an effective feature density for a set of panels using the feature density and a function that models the CMP process, (b) calculating filling amounts for the set of panels using a target feature density, the effective feature density, and the slack density, and (c) updating the feature density, the slack density, and the dummy feature density for the set of panels using the filling amounts. Note that decreasing the effective feature density variation decreases the post-CMP topography variation. Furthermore, note that, the convergence rate of the dummy feature density computation is increased because, in each iteration, the method updates the dummy feature density for the set of panels, instead of updating the dummy feature density for only a single panel.

Moreover, one embodiment of the present invention uses an efficient dummy density assignment method that closely integrates with a low-pass filter CMP model. By utilizing the variance-minimizing heuristic, this embodiment simultaneously assigns dummy densities to multiple panels in each step of the iteration to quickly achieve a substantially-optimal solution.

BRIEF DESCRIPTION OF THE FIGURES

FIG. 3 illustrates how adding dummy features can decrease post-CMP topography in accordance with an embodiment of the present invention.

FIG. 4 presents a flowchart that illustrates various high-level steps in a smart dummy filling process in accordance with an embodiment of the present invention.

DETAILED DESCRIPTION

Integrated Circuit Design and Fabrication

Figure 1:
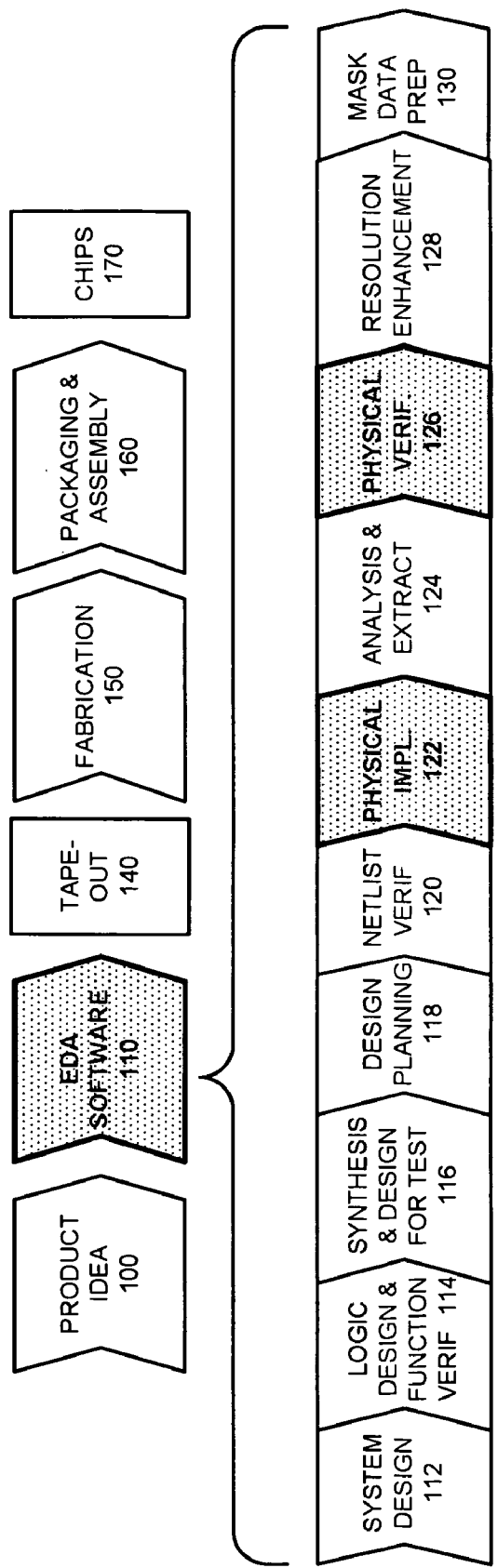
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention. The process starts with a product idea (step 100). Next, the product idea is realized using an integrated circuit, which is designed using Electronic Design Automation (EDA) software (step 110). Once the circuit design is finalized, it is taped-out (step 140). After tape-out, the process goes through fabrication (step 150), packaging, and assembly (step 160). The process eventually culminates with the production of chips (step 170).

The EDA software design step 110, in turn, includes a number of sub-steps, namely, system design (step 112), logic design and function verification (step 114), synthesis and design for test (step 116), design planning (step 118), netlist verification (step 120), physical implementation (step 122), analysis and extraction (step 124), physical verification (step 126), resolution enhancement (step 128), and mask data preparation (step 130).

Smart dummy filling can take place during the physical implementation step 122 or the physical verification step 126. Specifically, smart dummy filling can be implemented in the Astro® product or the Hercules® product from Synopsys, Inc.

Chemical-Mechanical Polishing (CMP)

CMP polishes a wafer surface to create a flat (planarized) surface. By creating a flat surface, CMP improves the quality of subsequent processes, such as, photolithography. Specifically, CMP combines the chemical removal effect of an acidic or basic fluid solution with the "mechanical" effect provided by polishing with an abrasive material and polishing pads. Even though CMP reduces topography variation, it usually cannot completely eliminate topography variation.

CMP can be used in various fabrication processes. For ease of exposition, the present application describes embodiments of the present invention in the context of the oxide CMP process which is applied to the aluminum interconnect fabrication flow. It will be apparent to one skilled in the art that the present invention can be easily applied to other types of CMP processes, such as, copper CMP and Shallow Trench Isolation (STI) CMP.

Figure 2:
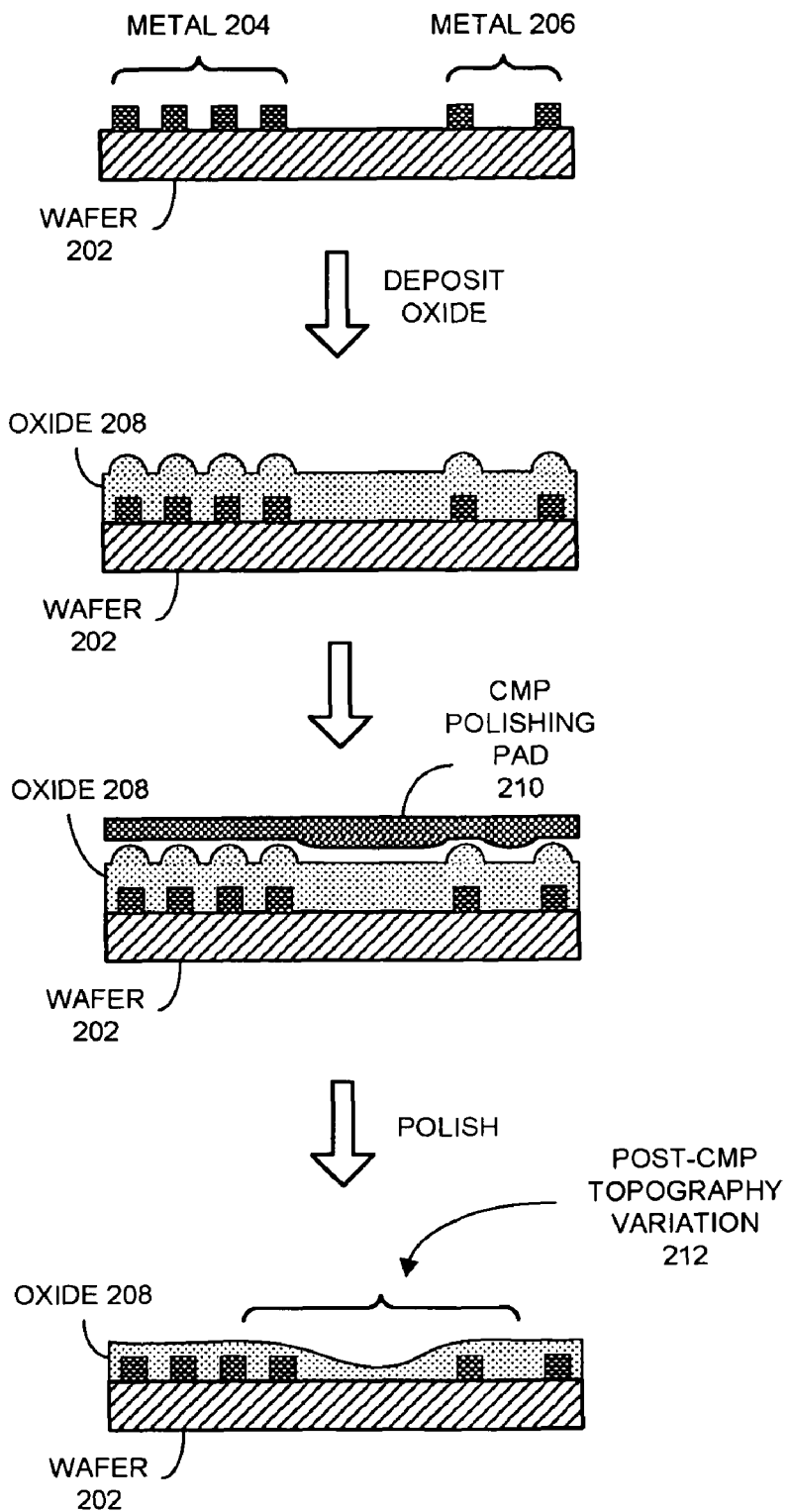
FIG. 2 illustrates an example of post-CMP topography variation in oxide CMP in accordance with an embodiment of the present invention.

FIG. 2 illustrates an example of post-CMP topography variation in accordance with an embodiment of the present invention. (The drawings in FIG. 2 are for illustration purposes only and may not represent an actual chip layout or CMP pad geometry. Furthermore, the post-CMP topography in FIG. 2 has been exaggerated for the sake of clarity.)

Integrated circuit chips can contain multiple metallization layers that are separated by oxide inter-level dielectric layers. Oxide CMP is performed primarily on each of the oxide layers. Specifically, after forming a layer of metal features 204 and 206 on wafer 202, the fabrication process deposits a layer of oxide 208. Next, the surface is polished using a CMP polishing pad 210 with polishing slurry (not shown) that is delivered to the surface of the wafer. The next layer of metal will be deposited on top of the oxide layer. The CMP process planarizes the oxide surface so that the next metal layer surface is flat after the deposition. The next metal layer is then patterned with the photolithography process to form metal interconnect wires. Note that a flat surface topography is required by the photolithography process to avoid significant defocusing.

Note that although CMP reduces topography variation 212, it does not completely eliminate topography variation. Furthermore, note that the topography variation 212 depends on the underlying metal feature density. Recent studies have shown that the topography variation can be reduced by decreasing the non-uniformity of the underlying metal feature density.

Smart Dummy Filling

Some foundries are using simple rule-base techniques to fill dummy features in low-density regions to reduce post-CMP topography variation. Unfortunately, these simple rule-based techniques have many shortcomings because they do not accurately model the complex CMP process. These techniques can sometimes be ineffective because they add dummy features at suboptimal locations. Moreover, these techniques can also be inefficient because they add more dummy features than necessary.

FIG. 3 illustrates how adding dummy features can decrease post-CMP topography in accordance with an embodiment of the present invention. (The drawings in FIG. 3 are for illustration purposes only and may not represent an actual chip layout or CMP pad geometry. Furthermore, the post-CMP topography in FIG. 3 has been exaggerated for the sake of clarity.)

Smart dummy filling techniques use more accurate CMP models to add metal dummy features 314 at appropriate locations on the wafer 302. Note that these dummy features are in addition to the existing metal features 304 and 306. The fabrication process then deposits a layer of oxide 308 and polishes the surface using a CMP polishing pad 310 and a polishing slurry (not shown). Note that the post-CMP topography variation 312 with dummy features 314 is less than the post-CMP topography variation 212 without dummy features.

Note that the illustrations in FIG. 2 and FIG. 3 are based on an oxide CMP process. But it will be apparent to one skilled in the art that dummy features can be used to decrease post-CMP topography variation in other types of CMP processes, such as, copper CMP and Shallow Trench Isolation (STI) CMP.

FIG. 4 presents a flowchart that illustrates various high-level steps in the smart dummy filling process in accordance with an embodiment of the present invention.

The process starts by performing layout density acquisition (step 402), which involves discretizing the integrated circuit into a set of panels and computing the metal density and slack density for each panel.

Figure 5:
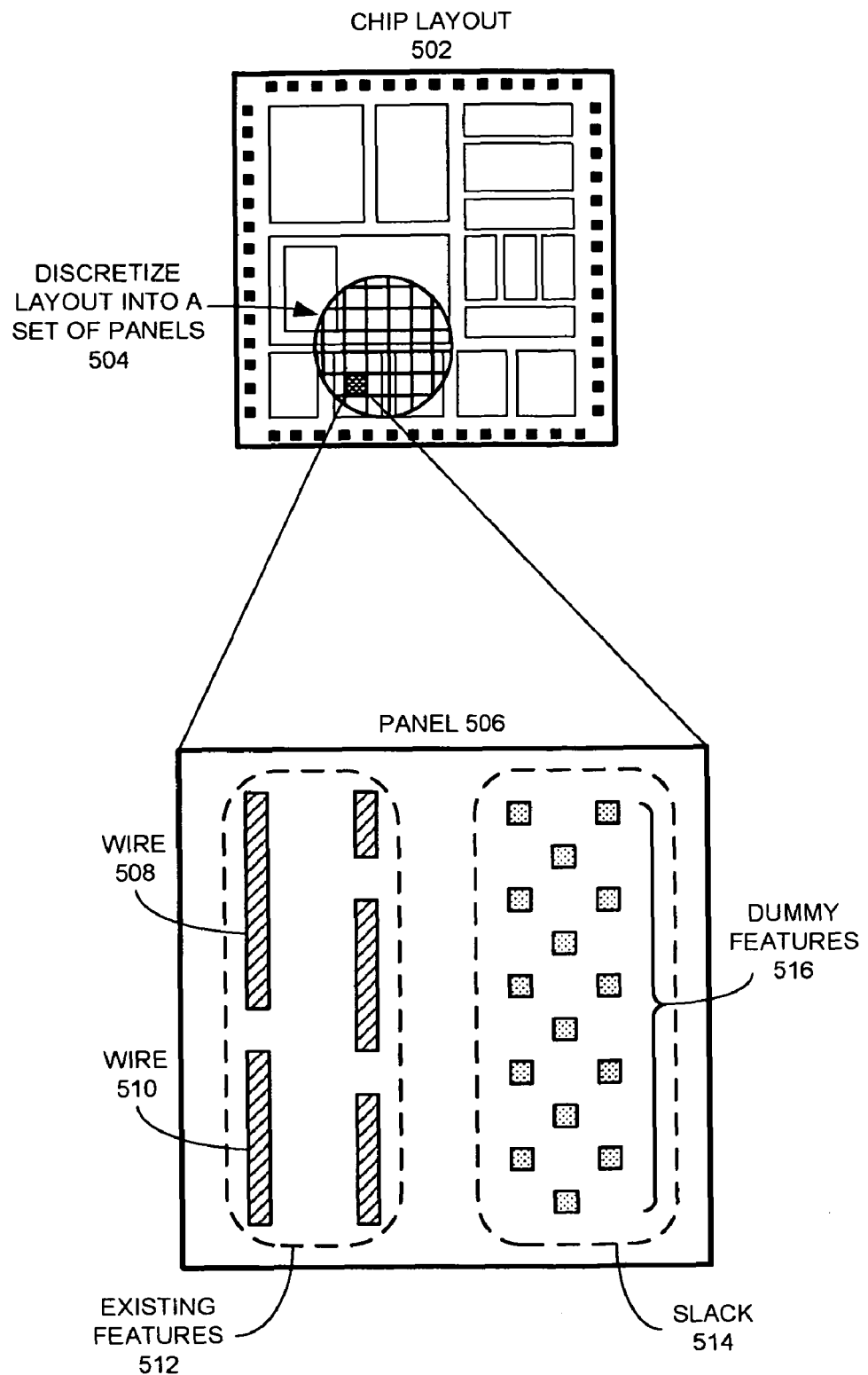
FIG. 5 illustrates the process of discretizing an integrated circuit layout into a set of panels and computing the metal density and slack density of each panel in accordance with an embodiment of the present invention.

FIG. 5 illustrates the process of discretizing the integrated circuit into a set of panels and computing the metal density and slack density of each panel in accordance with an embodiment of the present invention. Specifically, the chip layout 502 is discretized into a set of panels 506. (For ease of exposition, the process is illustrated for a single metal layer.) A panel, such as panel 506, can contain existing features 512, such as interconnect wires 508 and 510. Panel 506 can also contain a slack region 514 which does not contain any existing features and which can be used for adding dummy features, such as dummy features 516. The system computes the density of existing features 512 in panel 506. The system also computes the slack density for panel 506, which indicates the maximum density of dummy features 516 that can be added to the slack region 514 in panel 506.

Next, the system assigns dummy feature density (step 404). In this step, the system uses a CMP process model to compute the dummy feature density to be added to the slack region 514 in panel 506. Note that adding dummy features can reduce the post-CMP topography variation. The system then performs dummy feature placement (step 406) based on the computed dummy feature density and design rules. For example, the system may place dummy features 516 based on the computed dummy feature density. Once the new layout with dummy features is sent to the foundry for fabrication, the dummy features are produced and CMP is used to planarize the wafer that contains dummy features.

The most challenging step in this smart dummy-filling process is dummy feature density assignment 404 (which includes modeling the CMP process). Hence, utilizing an efficient dummy feature density assignment algorithm with the right CMP model is critical for successfully solving the smart dummy-filling problem.

One embodiment of the present invention uses a variance-minimizing iterative density assignment method that seamlessly integrates with effective-density CMP models. Furthermore, in one embodiment of the present invention, the CMP process is modeled using a 2-D filter function.

Process of Computing Dummy Feature Density

Figure 6:
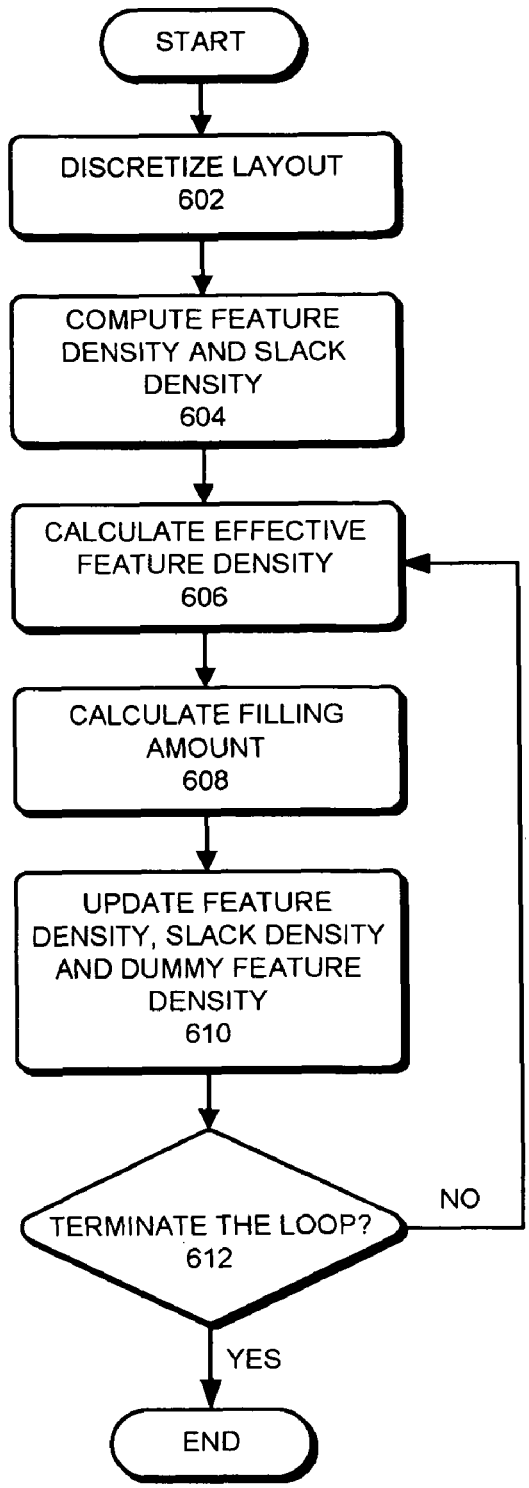
FIG. 6 presents a flowchart that illustrates the process of computing dummy feature density in accordance with an embodiment of the present invention.

FIG. 6 presents a flowchart that illustrates the process of computing dummy feature density in accordance with an embodiment of the present invention.

The process starts by discretizing the layout into a set of panels (step 602). For example, the chip layout 502 can be discretized into a set of panels 504. In one embodiment of the present invention, the panel size is chosen to be small enough to avoid large discretization errors. Specifically, in one embodiment of the present invention, the panel size is chosen to be less than 1/10 of the filter characteristic length of the function that models the CMP process.

Next, the system computes feature density and slack density (step 604). Specifically, the system computes the feature density of existing features 512 and the slack density that specifies the maximum density of dummy features that can be added to the slack region 514 in the panel 506. In one embodiment of the present invention, the feature density and slack density are adjusted to satisfy foundry rules. For example, the computed feature density can be increased so that the feature density meets a minimal density rule. Similarly, the computed slack density can be decreased so that the sum of the feature density and the slack density meets an upper density limit.

The system then computes the dummy feature density using an iterative process. Specifically, in one embodiment of the present invention, the iterative process is guided by a variance-minimizing heuristic to decrease the effective feature density variation, which is proportional to the final post-CMP topography variation according to the CMP low-pass filter model. Note that the effective feature density is also applicable to other CMP processes, such as, copper CMP and STI CMP. In another embodiment of the present invention, the iterative process involves prioritizing the panels in the set of panels.

The iterative process starts by computing the effective feature density (step 606). Note that decreasing the non-uniformity of the effective feature density can reduce the post-CMP topography variation.

In one embodiment of the present invention, the system computes the effective feature density by convolving the feature density with a function that models the CMP process. Specifically, in one embodiment of the present invention, the effective feature density is given by $$\rho_0(i,j) = IFFT(FFT(d(i,j)) \cdot FFT(f(i,j))),$$

where $\rho_0(i, j)$ is the effective feature density, $d(i, j)$ is the existing feature density, $f(i, j)$ is a function that models the CMP process, FFT is the fast Fourier transform, and IFFT is the inverse fast Fourier transform.

Furthermore, in one embodiment of the present invention, the CMP process is modeled using a 2-D filter function. For example, the CMP process can be modeled using the 2-D filter function $$f(x, y) = c_0 e^{\left[c_1 (x^2 + y^2)^{c_2}\right]},$$

where $c_0$, $c_1$, and $c_2$ are parameters, and x, y are the 2-D coordinates. In one embodiment of the present invention $c_0 = 0.1$, $c_1 = -0.1$, $c_2 = 1$, and x, y are measured in millimeters.

Moreover, in one embodiment of the present invention, the filter function is normalized so that a perfectly smooth layout in which the existing feature density, $d(i, j)$, is constant everywhere results in a perfectly smooth effective feature density, $\rho_0(i, j)$, that has the same value as the existing feature density $d(i, j)$.

Next, the system selects a set of panels and computes the filing amount for the set of panels (step 608) based on a variance-minimizing heuristic. Note that selecting low effective feature density panels to fill can improve the effective feature density profile. The variance-minimizing heuristic is used to guide the selection of a set of panels and to determine the filling amount for the set of panels. Specifically, the variance-minimizing heuristic selects panels and determines the filling dummy density amount based on the difference between the target effective feature density and the effective feature density, i.e., $\text{diff}(i, j) = t(i, j) - \rho_0(i, j)$, where $t(i, j)$ is the target effective feature density. In one embodiment of the present invention, the variance-minimizing heuristic first calculates $\text{diff}(i, j)$ for the plurality of panels. Next, it selects panels with large positive $\text{diff}(i, j)$ to fill dummy density and selects the panels with large negative $\text{diff}(i, j)$ to remove dummy density.

In one embodiment of the present invention, the variance-minimizing heuristic computes the filing amount for the selected panels using the expression $\Delta(i, j) = \alpha(t(i, j) - \rho_0(i, j))$, where $\Delta(i, j)$ is the filling amount, $\alpha$ is a damping factor that can be used to control the filling speed, and $\rho_0(i, j)$ is the effective feature density. Note that the damping factor is usually assigned a small value to achieve substantially-optimal filling quality. Furthermore, to ensure that the filling won't exceed the lower and upper limits, the system adjusts the filling amount $\Delta(i, j)$ as follows:

$$\Delta(i,j) = \min(\Delta(i,j), S(i,j)) \text{ if } \Delta(i,j) \geq 0, \text{ and}$$

$$\Delta(i,j) = \max(-d(i,j), \Delta(i,j)) \text{ if } \Delta(i,j) < 0,$$

where $S(i, j)$ is the slack density and $d(i, j)$ is the feature density. Note that, a negative value for $\Delta(i, j)$ means that dummy features (that were added in previous iterations) need to be removed. These adjustments are made to ensure that the filling amount is bounded by the slack on the positive side and by the current dummy feature density on the negative side.

It will be apparent to one skilled in the art that a variety of expressions can be used to compute the target effective feature density $t(i, j)$. In one embodiment of the present invention, the target effective feature density $t(i, j)$ can be specified by a user. Furthermore, in yet another embodiment of the present invention, the target effective feature density can be computed using the effective feature density. For example, in one embodiment of the present invention, the target effective feature density can be computed using the expression $t(i, j) = E[\rho_0(i, j)]$, where $E[\rho_0(i, j)]$ is the average of the effective feature density.

The system then updates the feature density, slack density, and the dummy feature density using the filling amount (step 610). Specifically, in one embodiment of the present invention, if the filling amount has a positive value, the system adds the filling amount to the dummy feature density and subtracts the filling amount from the slack density. Furthermore, the system adds the updated dummy feature density to the feature density to obtain the updated feature density that will be used for the next iteration.

Next, the system determines whether to terminate the iterative loop or not (step 612).

Specifically, in one embodiment of the present invention, the system terminates the iterative loop if the dummy feature density converges or if the filling amount becomes too small. It will be apparent to one skilled in the art that the iterative loop can be terminated based on a variety of conditions. For example, the system can decide to terminate the iterative loop if a maximum number of iterations have been reached.

If the system determines not to terminate the iterative loop, the system goes back to step 606, which involves calculating the effective feature density. On the other hand, the process ends if the system determines to terminate the iterative loop.

Figure 7:
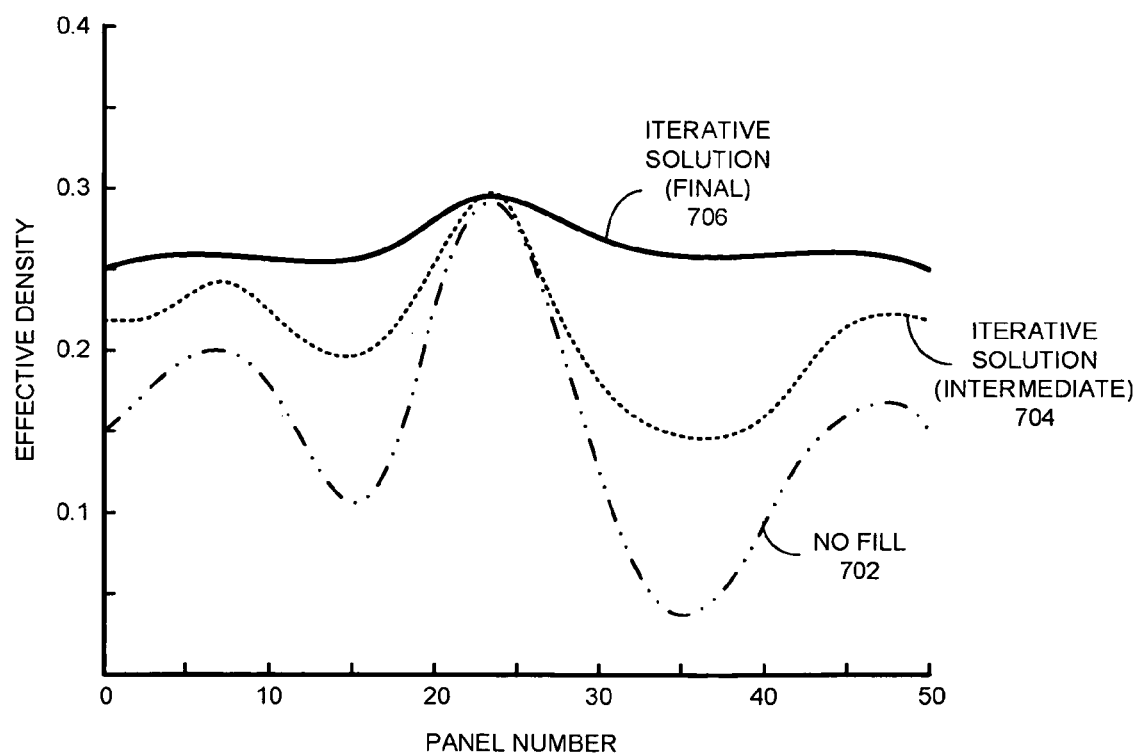
FIG. 7 presents various effective feature density curves that illustrate how an iterative process can reduce the non-uniformity of the effective feature density in accordance with an embodiment of the present invention.

FIG. 7 presents various effective feature density curves that illustrate how an iterative process can reduce the non-uniformity of the effective feature density in accordance with an embodiment of the present invention. For ease of exposition, FIG. 7 illustrates 1-D plots of the effective feature density. Note that, these plots are for illustration purposes only and do not represent an actual dummy feature density computation.

Curve 702 shows the "no fill" effective feature density, i.e., the effective feature density before the iterative process starts. Note that curve 702 has a large amount of non-uniformity. After multiple iterations, an intermediate iterative solution is illustrated by curve 704. Finally, once the iterative solution terminates, the final iterative solution is shown by curve 706. Note that the non-uniformity of curve 704 is less than curve 702, and the non-uniformity of curve 706 is less than curve 704.

Process of Adjusting the Filter Characteristic Length

Figure 8:
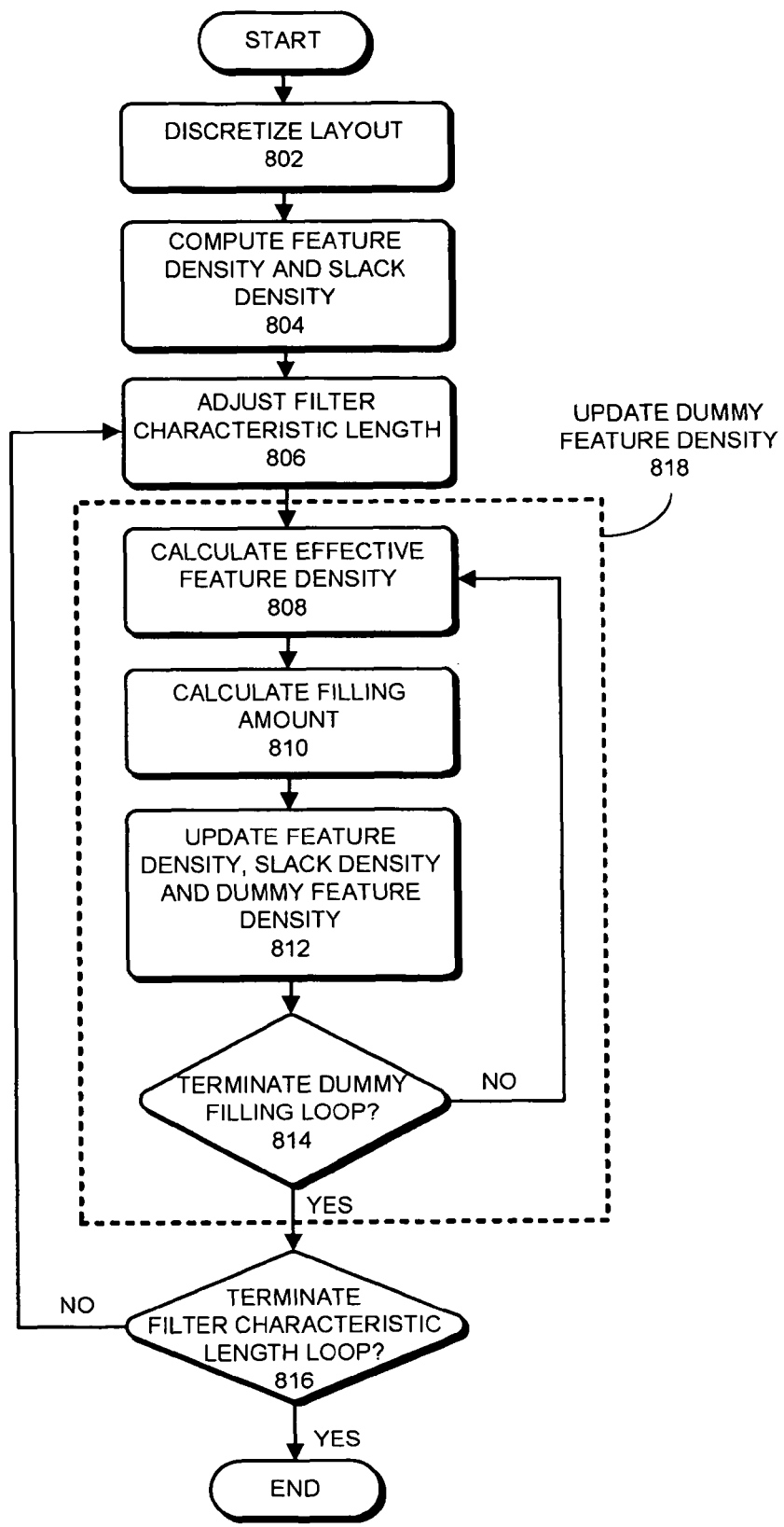
FIG. 8 presents a flowchart that illustrates the process of computing dummy feature density by adjusting the filter characteristic length in accordance with an embodiment of the present invention.

FIG. 8 presents a flowchart that illustrates the process of computing dummy feature density by adjusting the filter characteristic length in accordance with an embodiment of the present invention.

The process starts by discretizing the layout into a set of panels (step 802). For example, the chip layout 502 can be discretized into a set of panels 504. In one embodiment of the present invention, the panel size is chosen to be small enough to avoid large discretization errors. Specifically, in one embodiment of the present invention, the panel size is chosen to be smaller than 1/10 of the filter characteristic length of the filter function that models the CMP process.

Next, the system computes feature density and slack density (step 804). Specifically, the system computes the feature density of existing features 512 and the slack density which specifies the maximum density of dummy features that can be added to the slack region 514 in panel 506. In one embodiment of the present invention, the feature density and slack density are adjusted to satisfy foundry rules. For example, the feature density can be increased so that the feature density meets a minimal density rule. Similarly, the slack density can be decreased so that the sum of the feature density and the slack density meets an upper density limit.

The system then adjusts the filter characteristic length (step 806).

The CMP modeling function usually models the planarization effect of CMP. As a result, the filter function is typically good at "averaging" but not good at "selecting" low-density areas for filling. In other words, the CMP modeling function acts as a low-pass filter that removes high frequency components. Note that removing high frequency components in the feature density can cause some details to be deleted from the plot of the effective feature density. These details may be needed by the variance-minimizing heuristic to efficiently compute the filling amount to reduce the non-uniformity in the effective feature density. Usually, this problem occurs more frequently when the CMP modeling function is a filter with a large characteristic length, because those filters remove more high frequency components.

In one embodiment of the present invention, the filter characteristic length is gradually increased from a smaller value during an iterative process that computes dummy feature density, until it reaches the given characteristic length value. Note that a filter with a small characteristic length can efficiently locate and compute filling amounts for local low-density areas. Hence, the quality of the resulting solution for the dummy feature density assignment problem can be improved by adjusting the filter characteristic length.

Figure 9:
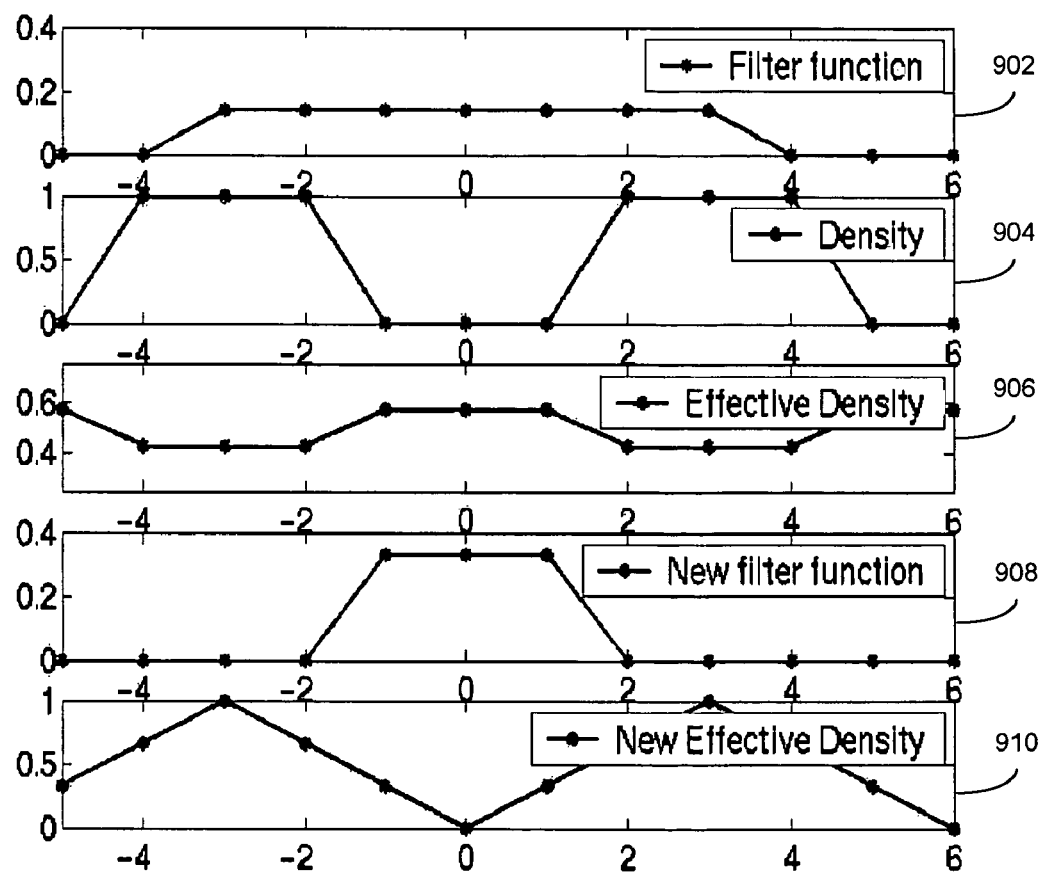
FIG. 9 presents various plots that illustrate the effect of adjusting the filter characteristic length in accordance with an embodiment of the present invention.

FIG. 9 presents various plots that illustrate the effect of adjusting the filter characteristic length in accordance with an embodiment of the present invention. Note that the plots shown in FIG. 9 are for illustration purposes only and do not reflect actual dummy feature density computations that involve adjusting the characteristic length of the filter.

Plot 902 shows a filter function with a large characteristic length that takes the average value of seven neighboring points. Plot 904 shows the feature density and plot 906 shows the effective feature density, which is obtained by convolving the feature density shown in plot 904 with the filter function shown in plot 902. Note that the effective feature density plot 906 has the maximal value at position zero even though the feature density shown in plot 904 has the minimal value at this point. Consequently, if the system computes the filling amount using a filter with a large characteristic length, the system may erroneously fill in high-density areas with zero slack density to fill instead of low-density areas.

Plot 908 shows a filter with a short characteristic length and plot 910 shows the resulting effective feature density that can be computed by convolving the feature density shown in plot 904 with the short characteristic length filter function shown in plot 908. Note that, unlike the effective feature density plot 906, plot 910 has a small value at position zero. This example demonstrates that by using a filter with a small characteristic length, the system can efficiently identify and fill low-density areas.

The system then updates the dummy feature density (step 818). It will be apparent to one skilled in the art that a variety of techniques can be used to update the dummy feature density.

In particular, in one embodiment of the present invention, the system updates the dummy feature density using an iterative process. The process starts by computing the effective feature density (step 808). Note that post-CMP variation can be reduced by decreasing the non-uniformity of the effective feature density. Next, the system calculates the filing amount for the set of panels (step 810). The system then updates the feature density, slack density, and the dummy feature density using the filling amount (step 812). Next, the system determines whether to terminate the dummy filling loop or not (step 814). If the system determines not to terminate the dummy-filling loop, the system goes back to step 808. On the other hand, if the system determines to terminate the dummy-filling loop, the process for computing the dummy filling density ends for the current value of the filter characteristic length.

Next, the system determines whether to terminate the loop that iteratively adjusts the filter characteristic length (step 816).

If the system determines not to terminate the loop, the system goes back to step 806, which begins the next iteration by adjusting the filter characteristic length. On the other hand, the iterative process ends if the system determines to terminate the iterative loop.

CONCLUSION

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

For ease of exposition, the present application describes embodiments of the present invention in the context of an oxide CMP process. It will be apparent to one skilled in the art that the present invention can be readily applied to other types of CMP processes, such as, copper CMP and Shallow Trench Isolation (STI) CMP.

Furthermore, the data structures and code described in this detailed description are typically stored on a computer-readable storage medium, which may be any type of device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

What is claimed is:

1. A method for computing dummy feature density for a CMP (Chemical-Mechanical Polishing) process, wherein the dummy feature density is used to add dummy features to a layout to reduce a post-CMP topography variation, the method comprising:
   discretizing a layout of an integrated circuit into a plurality of panels;
   computing a feature density and a slack density for a panel; and
   computing, by computer, a dummy feature density for the panel by, iteratively,
      adjusting a characteristic length of a filter function to obtain an adjusted filter function, wherein the filter function models the CMP process; and
      updating the dummy feature density for the panel using the feature density, slack density, and the adjusted filter function;
   wherein the computed dummy feature density is used to add dummy features to the layout, thereby reducing the post-CMP topography variation.

2. The method of claim 1, wherein updating the dummy feature density involves:
   calculating an effective feature density $\rho_0(i, j)$ for a plurality of panels using the feature density and a function $f(i, j)$ that models the CMP process, wherein decreasing the effective feature density variation decreases the post-CMP topography variation;
   calculating a filling amount $\Delta(i, j)$ for a set of panels in the plurality of panels using a target effective feature density $t(i, j)$, the effective feature density, and the slack density, and wherein the set of panels is selected using a variance-minimizing heuristic; and
   updating the feature density, the slack density, and the dummy feature density for the set of panels using the filling amount;
   wherein the convergence rate of the dummy feature density computation is increased because, in each iteration, the method updates the dummy feature density for the set of panels, instead of updating the dummy feature density for only a single panel.

3. The method of claim 2, wherein a size of each panel in the plurality of panels is less than 1/10 of the characteristic length of the filter function.

4. The method of claim 2, wherein calculating the effective feature density $\rho_0(i, j)$ involves normalizing the filter function that models the CMP process so that a perfectly smooth feature density results in a perfectly smooth effective feature density that is equal to the feature density.

5. The method of claim 1, wherein the filter function that models the CMP process is a 2-D filter function.

6. A non-transitory computer-readable storage medium storing instructions that when executed by a computer cause the computer to perform a method for computing dummy feature density for a CMP (Chemical-Mechanical Polishing) process, wherein the dummy feature density is used to add dummy features to a layout to reduce a post-CMP topography variation, the method comprising:
   discretizing a layout of an integrated circuit into a plurality of panels;
   computing a feature density and a slack density for a panel; and
   computing a dummy feature density for the panel by, iteratively,
      adjusting a characteristic length of a filter function to obtain an adjusted filter function, wherein the filter function models the CMP process; and
      updating the dummy feature density for the panel using the feature density, slack density, and the adjusted filter function;
   wherein the computed dummy feature density is used to add dummy features to the layout, thereby reducing the post-CMP topography variation.

7. The non-transitory computer-readable storage medium of claim 6, wherein updating the dummy feature density involves:
   calculating an effective feature density $\rho_0(i, j)$ for a plurality of panels using the feature density and a function $f(i, j)$ that models the CMP process, wherein decreasing the effective feature density variation decreases the post-CMP topography variation;
   calculating a filling amount $\Delta(i, j)$ for a set of panels in the plurality of panels using a target effective feature density $t(i, j)$, the effective feature density, and the slack density, and wherein the set of panels is selected using a variance-minimizing heuristic; and
   updating the feature density, the slack density, and the dummy feature density for the set of panels using the filling amount;
   wherein the convergence rate of the dummy feature density computation is increased because, in each iteration, the method updates the dummy feature density for the set of panels, instead of updating the dummy feature density for only a single panel.

8. The non-transitory computer-readable storage medium of claim 7, wherein a size of each panel in the plurality of panels is less than 1/10 of the characteristic length of the filter function.

9. The non-transitory computer-readable storage medium of claim 7, wherein calculating the effective feature density $\rho_0(i, j)$ involves normalizing the filter function that models the CMP process so that a perfectly smooth feature density results in a perfectly smooth effective feature density that is equal to the feature density.

10. The non-transitory computer-readable storage medium of claim 6, wherein the filter function that models the CMP process is a 2-D filter function.

11. An apparatus for computing dummy feature density for a CMP (Chemical-Mechanical Polishing) process, the apparatus comprising:
   a discretizing mechanism configured to discretize a layout of an integrated circuit into a plurality of panels;
   a density-computing mechanism configured to compute a feature density and a slack density for a panel; and
   a dummy-density-computing mechanism configured to compute a dummy feature density for the panel by, iteratively,
      adjusting a characteristic length of a filter function to obtain an adjusted filter function, wherein the filter function models the CMP process; and
      updating the dummy feature density for the panel using the feature density, slack density, and the adjusted filter function;

wherein the computed dummy feature density is used to add dummy features to the layout, thereby reducing a post-CMP topography variation.

12. The apparatus of claim 11, wherein the dummy-density-computing mechanism is configured to:
   calculate an effective feature density $\rho_0(i, j)$ for a plurality of panels using the feature density and a function $f(i, j)$ that models the CMP process, wherein decreasing the effective feature density variation decreases the post-CMP topography variation;
   calculate a filling amount $\Delta(i, j)$ for a set of panels in the plurality of panels using a target effective feature density $t(i, j)$, the effective feature density, and the slack density, and wherein the set of panels is selected using a variance-minimizing heuristic; and
   update the feature density, the slack density, and the dummy feature density for the set of panels using the filling amount;
   wherein the convergence rate of the dummy feature density computation is increased because, in each iteration, the method updates the dummy feature density for the set of panels, instead of updating the dummy feature density for only a single panel.

13. The apparatus of claim 12, wherein a size of each panel in the plurality of panels is less than 1/10 of the characteristic length of the filter function.

14. The apparatus of claim 12, wherein calculating the effective feature density $\rho_0(i,j)$ involves normalizing the filter function that models the CMP process so that a perfectly smooth feature density results in a perfectly smooth effective feature density that is equal to the feature density.

15. The apparatus of claim 11, wherein the filter function that models the CMP process is a 2-D filter function.

* * * * *